Dec. 23, 1941.  W. LEATHERS  2,266,976
VERTICAL CANISTER TYPE VACUUM CLEANER
Filed May 25, 1938
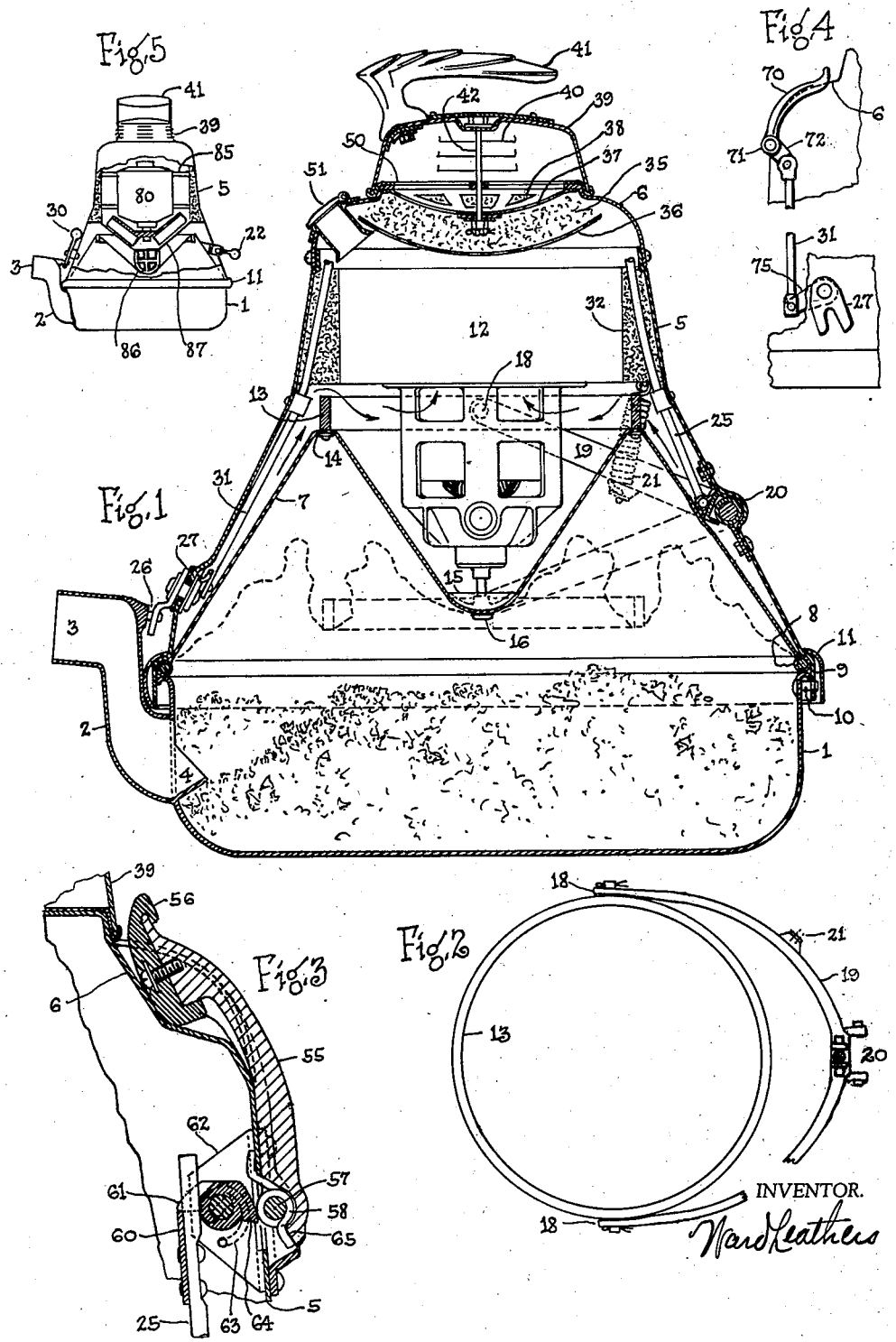
INVENTOR.
Ward Leathers Patented Dec. 23, 1941

2,266,976

UNITED STATES PATENT OFFICE 2,266,976

VERTICAL CANISTER TYPE VACUUM CLEANER

Ward Leathers, Haworth, N. J., assignor to Quadrex Corporation, New York, N. Y.

Application May 25, 1938, Serial No. 209,909

2 Claims. (Cl. 183—58)

The object of my invention is to produce a compact, lightweight, portable, domestic vacuum-cleaner from which the dirt may be instantly removed in a smooth, solid receptacle. The use of such receptacle is highly desirable because the dirt may then be disposed of by the simple act of dumping the receptacle and having little or no dust stick to it. My invention is specifically applied to the canister-type machine, i. e., the type wherein the motor-air-impelling-unit is disposed in a casing which rests on the floor and whereby all cleaning is done through an attached hose.

One object of my invention is reached by providing a filter (air-strainer) inside the canister case through which the air passes before it reaches the air-impeller, and so disposed that when it is disturbed by a shaking mechanism the dirt may travel from the entire dirt-exposed surface of the filter in a gravity direction toward and into the dirt-receptacle. With my arrangement the filter may have a sufficient area to offer a minimum resistance to air-flow and permit the telescoping or fitting together of such sizable filter with the motor-air-impelling-unit. Cleaning of the filter is accomplished by means of a mechanism for "snapping" the filter to release dirt and dust which clings thereto.

The objects as stated are also attained by other novel and desirable features, such as means of locking the container to the case at a plurality of points on their contacting rims, the means being engageable and releasable from a single manual control disposed adjacent the said rims or remote therefrom.

I have also provided novel means for obtaining compressed air for blowing purposes such as blowing dust from books, piano-actions, or blowing air into feather pillows, or for spraying moth repelling liquids, disinfectants, paint, and the like.

My invention comprises primarily a canister-type machine with a vertical rather than horizontal axis, and in such arrangement I have added greatly to the convenience of use of such machine by disposing all the necessary controls on the top thereof where they are accessible without obliging the user to stoop to reach them.

Without undue bulk my vertical type canister provides greater filter area, requires no removal of filter from the machine, shakes from the outside without dust dissemination, and puts the dirt into an instantly releasable receptacle from which it may be readily dumped.

Heretofore means of obtaining clean pressure air for blowing purposes have been provided on canister-type vacuum-cleaners primarily by the reattachment of the cleaning hose to an outlet located on the opposite side of the air-impelling-unit. This cleaning hose, which must be of considerable diameter for suction cleaning purposes has been clumsy for blower use, never clean enough on the inside for use in conjunction with bedding, pillows, and for other cleanly uses, when merely transposed for blower use. I have solved this problem by a novel arrangement wherein the air is permitted free escape from ample outlet ports for normal cleaning use which are closable when the machine is used for blowing purposes and a small diameter hose, all that is needed for pressure purposes, attachable for receiving the full pressure generated by the air-impelling-unit. Thus the blowing element is always clean, and far more convenient.

I have devised my filter arrangement wherein the dirt-receiving side of the filter faces downward toward gravity, together with the filter "snapping" mechanism, local or remote control, in such manner that it is adaptable to either the type of cleaning cycle that employs the multiple-stage-compressor of small air-flow volume-capacity and high air-differential-pressures at the cleaning nozzle, or to the single stage conical fan compressor unit of larger air-flow volume and lesser differential pressures at the nozzle. Both types of cleaning cycles are in present-day use and my invention as herewith set forth is equally applicable to both.

In order to set forth my invention so that all those familiar with these arts may understand it, I have prepared the following specification and appended drawing, of which:

Figure 1 is a vertical, axial, substantially fully cross-sectioned view of my vertical canister-type vacuum-cleaner with multiple-stage rotary compressor.

Figure 2 shows in plan view a portion of the filter shaking mechanism.

Figure 3 shows operating handle mechanism partially cross-sectioned.

Figure 4 is a diagrammatic representation of remote control for shaking mechanism.

Figure 5 is a diagrammatic, partially sectioned side elevation of my vertical-type canister with single-stage rotary compressor.

A dirt receptacle 1, Figure 1, is designed to rest on the floor and serve as a support for the remainder of the machine. It has a pan-like shape, preferably round for manufacturing reasons although it may have other form, and may be made of any suitable material such as sheet metal, aluminum for lightness, or it may be made of suitable metal for vitreous enamel and be manufactured by similar process to that of enamelled cooking ware. It is provided with a spout 2 joined to it in manner suitable to the materials and process of manufacture, which spout has an attachment socket 3 for a cleaning hose. The spout 2 has an inwardly projecting air-scoop 4 at the bottom for deflecting the air upward inside the container thus avoiding needless disturbance of the accumulated dirt. Over the receptacle 1 and resting on the rim thereof, is a canister casing 5. This casing is provided with a closure or top 6 which may be made as a separate part or may, if desired, be stamped integral with the casing 5. The cap and casing may be joined together in any suitable manner as by screws. Within the casing and immediately above the receptacle is a filter-element 7 of suitable filtering material such as filter-fabric, or preferably a composite filter as set forth in my co-pending application No. 208,181, provided with attachment at the bottom rim (shown for convenience as a hem sewn around a continuous wire ring) thus forming a rigid welt 8. The welt may be held upward in a rim flange in the case 5 by means of the filter operating mechanism hereinafter described, or may be held by other suitable means. The upper rim of the dirt-receptacle impinging against the welt, guided by the case flange 9 forms a dust-tight seal. Bayonet slots disposed in the case flange 9 at suitable intervals about the periphery register with bayonet pins 10 disposed at similar intervals and permanently attached to the dirt-receptacle 1. An outer ring or rim of metal 11 may cover the bayonet-locking mechanism for appearance purposes. It should be noted that when the case which supports the multiple-stage-compressor-fan and motor-unit 12 of conventional design, is lifted from the dirt-receptacle and set on the floor it makes contact throughout its entire periphery. Heretofore such devices have been made with legs but with the structure herein described, when the machine is lifted off the receptacle and set on a piece of newspaper on the floor by the user, any dust floating in the air, due to filter disturbance for shaking purposes, will be entrapped.

The filter 7 may be made substantially as follows: The filter material or element is cut in a circle of suitable size and a segment of suitable arc is cut therefrom. When the sides of the fabric adjacent the segment are sewn together the circular fabric has assumed a conical shape. When the center of the cone is turned inward the result produces the conical reentrant filter as shown in Figures 1 and 5. At the circular juncture of the two cones a light-weight ring 13 is attached to the filter by any suitable means. The fabric may be joined to the ring by an interial ring or welt 14 of metal, leather, fabric tape, or other suitable material held together by suitable means such as drive-screws, or, if desired, the ring 13 may be joined to the filter entirely by sewing, that is, by covering with an additional piece of fabric and sewing the same to the filter. The tip of the internal cone may be joined to a suitable and rigid holder 15 by means of a glove fastener 16. The holder 15 is held firmly at the bottom end of the motor-compressor-unit at a point central of the machine and producing a coaxial arrangement of filter, motor-compressor-unit, and outer case. The ring 13 is held in trunnions 18 on a yoke or bow 19 (for details see Figure 2). The bow 19 is hingeably joined to the case 5 at 20, and is held upward by two springs 21 joined at their upper ends at fixed locations. When the bow is pressed downward it carries the ring and filter to a position illustrated in dotted lines, and when suddenly released the springs 21 "snap" the filter to its normal position, thus disengaging dirt and dust clinging thereto. Any desired means of so "snapping" this filter may be employed which consists of a member disposed outside the case and manually operable (as at 22, Figure 5). I prefer, however, for reasons heretofore given, to utilize a remote control in order to locate the manual operating means on the top of the machine. A preferred means of pushing the bow 19 downward consists of a rod 25 which is hingeably joined at its lower end to the bow. A manually operable lever and snapping-latch will be hereinafter more fully described under Figure 3.

In order to make the bayonet-lock means of joining dirt-receptacle 1 to the case 5 practical and convenient to the user, it is necessary that a latching device be provided which will move these two elements with respect to each other in an opposite and rotary direction. For this purpose I have provided a pin 26 conveniently, rigidly attached to the attachment socket 3 and a notched latching piece 27 firmly but rotatably attached to the case 5. This latch may be manually turned by a handle made integral with it on the exterior of the machine (as at 30 in Figure 5), or for a reason heretofore given, may be operated from the inside by means of a lever and rod 31. Remote manual control for same will be hereinafter described in conjunction with Figure 4. The multiple-stage-compressor-unit 12 may be attached to the case 5 by any conventional method such as rubber cushions or rings. Means of closing or filling the space between the compressor 32 and the case may consist of felted material primarily for sound deadening purposes. It may be used for preventing the flow of air between the high and low pressure sides of the compressor and may also serve as a means of passing operating rods 25 and 31 therethrough in a substantially frictionless and air-tight manner.

The exhaust air from the blower passes upward through a sound muffler 35 which may consist of a lower screen or perforated holder 36 and an upper perforated part or holder 37. Between these parts I prefer to use a loose wad of horsehair as an air-free sound trap or muffler. The upper holder 37 is shown with large holes or slots therein through which the air may freely flow. This part is very rigid and held in a recess on the under side of the cap 6 which also is amply ported at 38. A ventilator cap 39 provided with louvers 40 or other ample means of air exit, rigidly supports a carrying handle 41. The ventilator cap 39 is rotatably but firmly joined to the holder 37 as by a long bolt 42 so that the ventilator cap 39 may be rotated with respect to the case 5 by means of the handle 41. Joined to the ventilator cap 39 in any suitable manner is a ported part 50 held in contact with the ported portion of the cap 6. In normal position for cleaning operation the ports in the cap 6 and the part 50 register furnishing a free outlet for the air. The ports in both parts are so devised that when the ventilator cap 39 is turned 90° the ports are entirely closed, thus the outlet for the air on the exhaust side of the compressor may be completely closed. In order to attach the small size blower hose as aforementioned, I have found it convenient to provide a socket 51 and a normally closed cover for same. In operation, for blowing purposes, the ports in the cap 6 and the part 50 are closed and the blower hose attached at the socket 51.

Remote control means of operating the filter-snapping mechanism may conveniently consist of a lever 55, Figure 3, disposed near the top of the machine for the operator's convenience. It may have a rubber cap 56 and it is hinged to the case 5 at 57. This lever requires sufficient length to give ease of operation and is used for operating most conveniently in a substantially horizontal position where the operator may press downward on same. In order that it may not be objectionably protrusive I have provided a recess in the cap 6 wherein it may be out of the way when not in use, and a spring 58 for holding it or springing it into such position. The operating rod 25 is joined to a flat hardened steel latch piece 60 which engages a hardened steel rotary-acting pair of teeth 61 between which the rod 25 may move freely longitudinally. The rod 25 is held between the teeth by its own spring action. The rotary tooth part 61 is held on the inside of the case 5 by a frame or bracket 62 and is returned to its normal position after "snapping" the filter by a spring 63. Another but broader tooth 64 on the opposite side of the part 61 engages a boss 65 on the lever 55 when the lever is used for operating the filter-snapping mechanism. In operation this manually operating mechanism works as follows: The lever 55 is turned outward from the machine to a point approaching the horizontal at which time the boss 65 engages the tooth 64. As the lever is pressed downward the rotary part 61 turns in such direction that the pair of teeth engaging the hardened part 60 push the rod 25 downward, thus pressing the bow 19 downward to a predetermined position at which point the teeth 61 slip past the hardened part 60; at which moment the ring 13, the bow 19, and the rod 21 are snapped violently upward by the springs 21. The lever 55 is then permitted to be raised by the spring 58 through a sufficient arc to re-engage the teeth 61 and the hardened piece 60. When the lever 55 is so pressed downward and released approximately three times by the operator, the filter 1 is snapped free of dirt. When the operator's hand leaves the lever 55, the spring 58 throws it back into the position shown where it is conveniently out of the way substantially buried in a recess in the cap 6. It should be noted that the primary purpose of this mechanism is to get a remote control for "snapping" the filter, to dispose it at a convenient location on the top of the machine, and provide an easy downward pressing action for operating. It is also evident that these objects may be accomplished by other arrangement of parts providable by those skilled in the mechanical arts.

The bayonet-locking devices 26 and 27 (of Figures 1 better illustrated in Figure 4) may be remotely controlled by lever 70, also conveniently recessed in the cap 6 and hingeably joined thereto at 71. The lever is provided with a short inner arm 72 forming a bell-crank to which is hingeably joined the rod 31 (upper and lower portions of Figure 4 are turned 90° to each other). Likewise a short inner arm 75 rigidly joined to the outer jaw 27 forms a bell-crank to which the rod 31 is hingeably joined on the inside. When the lever 70 is turned outward from the machine the jaw 27 turns a sufficient distance to release the bayonet joints on the periphery of the dirt-receptacle. When in this position, the upper portion of the machine may be lifted freely from the dirt-receptacle and the jaw 27 disengaged with ease. To reverse the operation the upper portion of the machine is placed over the receptacle in such manner that the jaw 27 engages the pin 26, the lever 70 is returned to its normal position in the recess in the cap, the bayonet joints are all thereby pushed into a locked position and the juncture between machine and dirt-receptacle made substantially dust-tight.

The multiple-stage-compressor-unit, illustrated in Figure 1, has as its object the creation of that type of cleaning cycle as found today in common use which employs high differential air pressures at the cleaning nozzle and small air-flow. In order to use the other commonly used type of cycle which employs lower differential air pressures at the nozzle and much larger air-flow, as employed in the conventional bag-on-the-handle type cleaners, where the filter is of much greater dimensions, I have devised means of using in conjunction with my snap-filter a type of motor-driven-air-impeller which, when provided with sufficient filtering capacity, i. e., volume air/filtration, gives higher cleaning values at the nozzle than obtainable with the first mentioned type, although the nozzle requires slight modification for such use. Such modification consists of permitting a more generous flow under the stroker bars as is common to straight suction cleaners of bag-on-the-handle type. By the use of the filter-element of larger filter/flow capacity as aforedescribed, and a single stage compressor to be described, larger air cleaning values may be obtained with the canister-type machine. Such an arrangement is ideally suited for use with my snap-filter herewith described. A motor-air-impelling-unit 80 comprises a fan of the truncated cone type which has the usual inlet at the center but has freedom for air discharge throughout the entire periphery at the outer tips of the blades. This type of air-impeller for these purposes gives higher cleaning efficiencies in the range of a normal 1"-diameter-circular-flow-opening whereas the multiple-stage-compressor gives its better efficiency in the range of ½"-diameter-circular-flow-opening. The volume of air between the two types are roughly two to one, or three to one, using the same E. M. F., and with each built in their best aerodynamic form. In this arrangement the motor is supported on suitable members 85 which cross the air stream and may be provided of air stream section. At the inlet to the fan a perforated part or cage 86 rigidly joined to the fan cover 87 holds the filter free from contact with the opening. This perforated part 86 may be made of sheet metal, wire, die-casting, or in other suitable manner. It holds the inner filter cone in a fixed position at the bottom and permits of free flow of air from the entire filter to the eye of the fan.

Having set forth my invention in clear and understandable terms, I wish to make note of the fact that these principles may be used in many mechanical ways for the purposes set forth without departing from the spirit of my invention.

I claim:

1. In a vacuum-cleaner, a pan-like lower shell for receiving the accumulated dirt, an upper shell joined to the lower shell along a continuous air-tight substantially circular horizontal joint, said upper shell supporting therein a motor-driven-air-impelling-unit and having an outlet for same, a filter with its rim joined to the upper shell in an air-tight manner adjacent the said horizontal joint, a plurality of bayonet type couplings between the said upper and lower shells for locking them together, and manual means for turning one shell with respect to the other for joining and unjoining the said bayonet couplings, said means comprising a lever rotatably joined to the said upper shell and operably engaging the other shell, and with a mechanical link for operating the said lever disposed between the filter and said upper shell and provided with manual actuating means extending through said upper shell.

2. In a vacuum-cleaner, a pan-like lower shell for receiving the accumulated dirt, an upper shell joined to the lower shell along a continuous air-tight substantially circular horizontal joint, said upper shell supporting therein a motor-driven-air-impelling-unit, a plurality of bayonet type couplings between the said upper and lower shells for joining them together, and means for turning one shell with respect to the other for joining and unjoining the said bayonet couplings, the said means comprising a lever on the outside of said shells rotatably joined to the upper of said shells, the said lever joined by push-and-pull mechanism disposed on the inside of said upper shell to a point on the upper surface of said upper shell where manual means of operating said push-and-pull mechanism are externally disposed.

WARD LEATHERS.